UNITED STATES PATENT OFFICE.

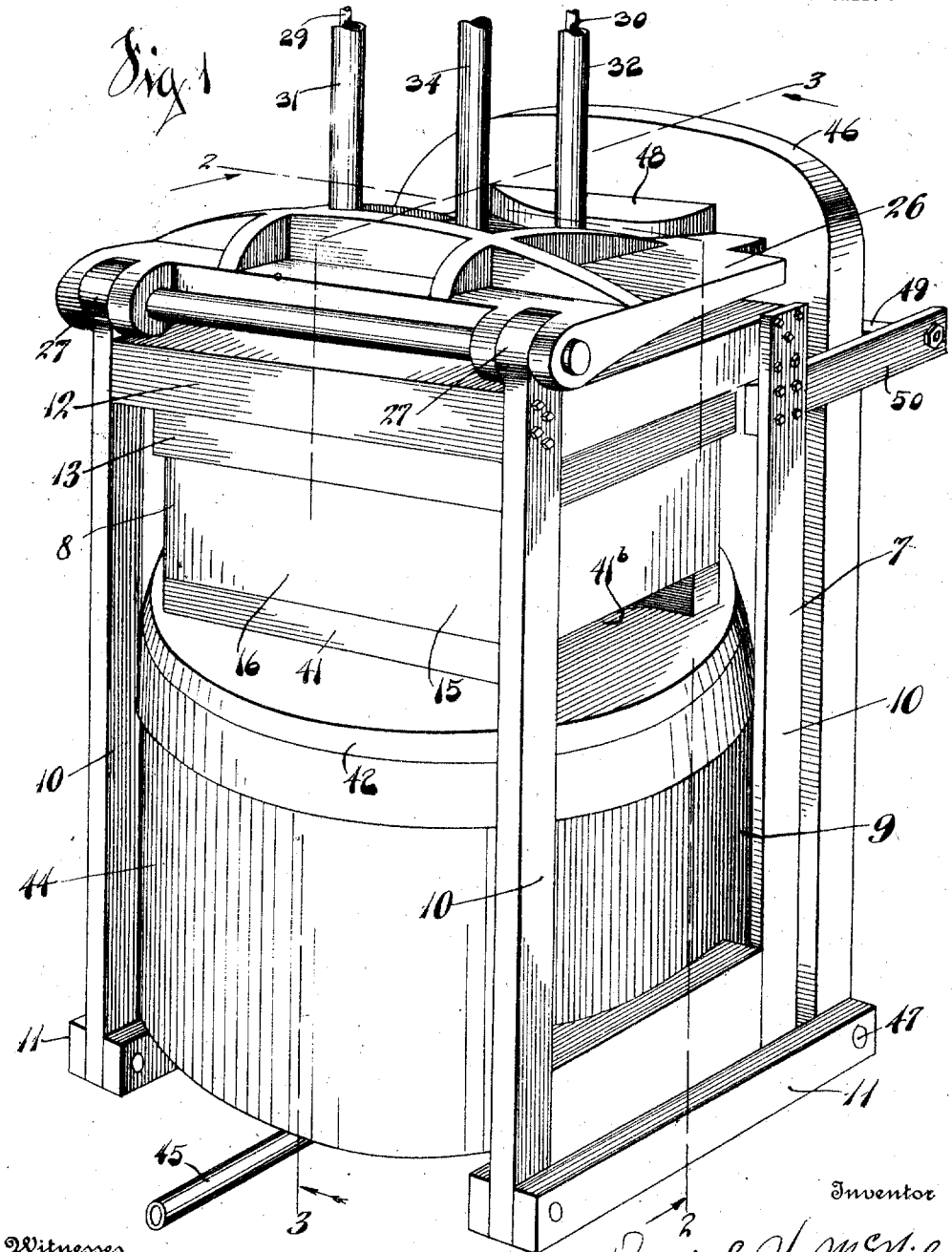

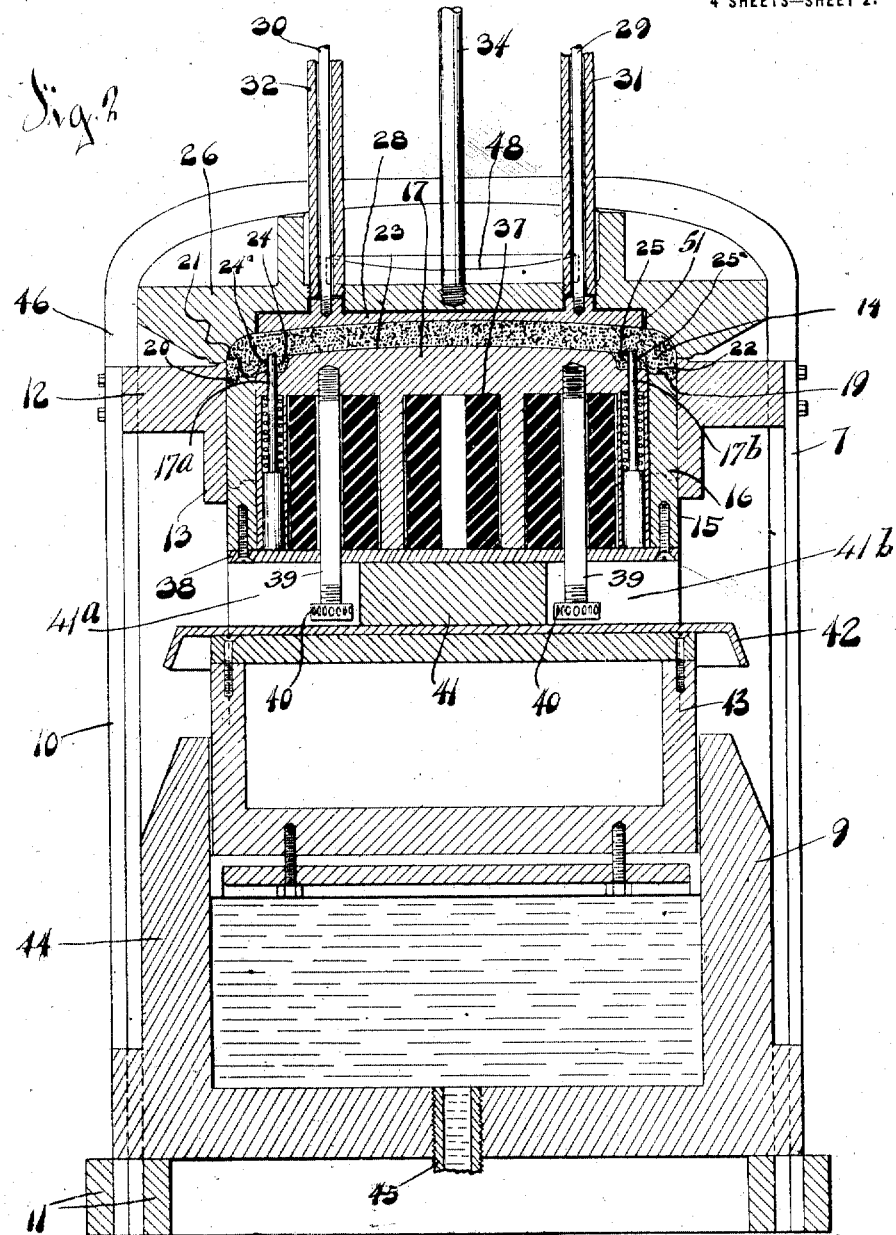

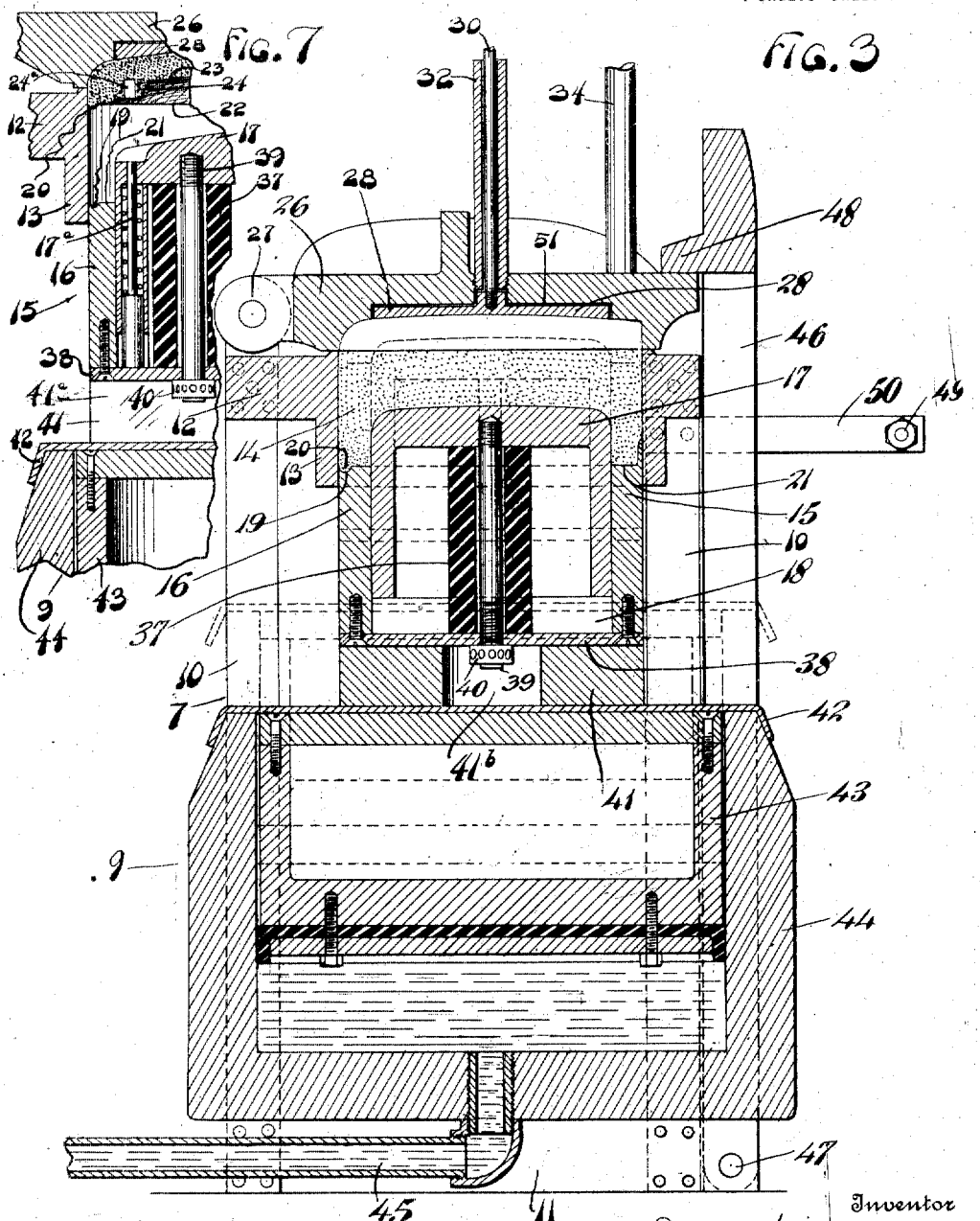

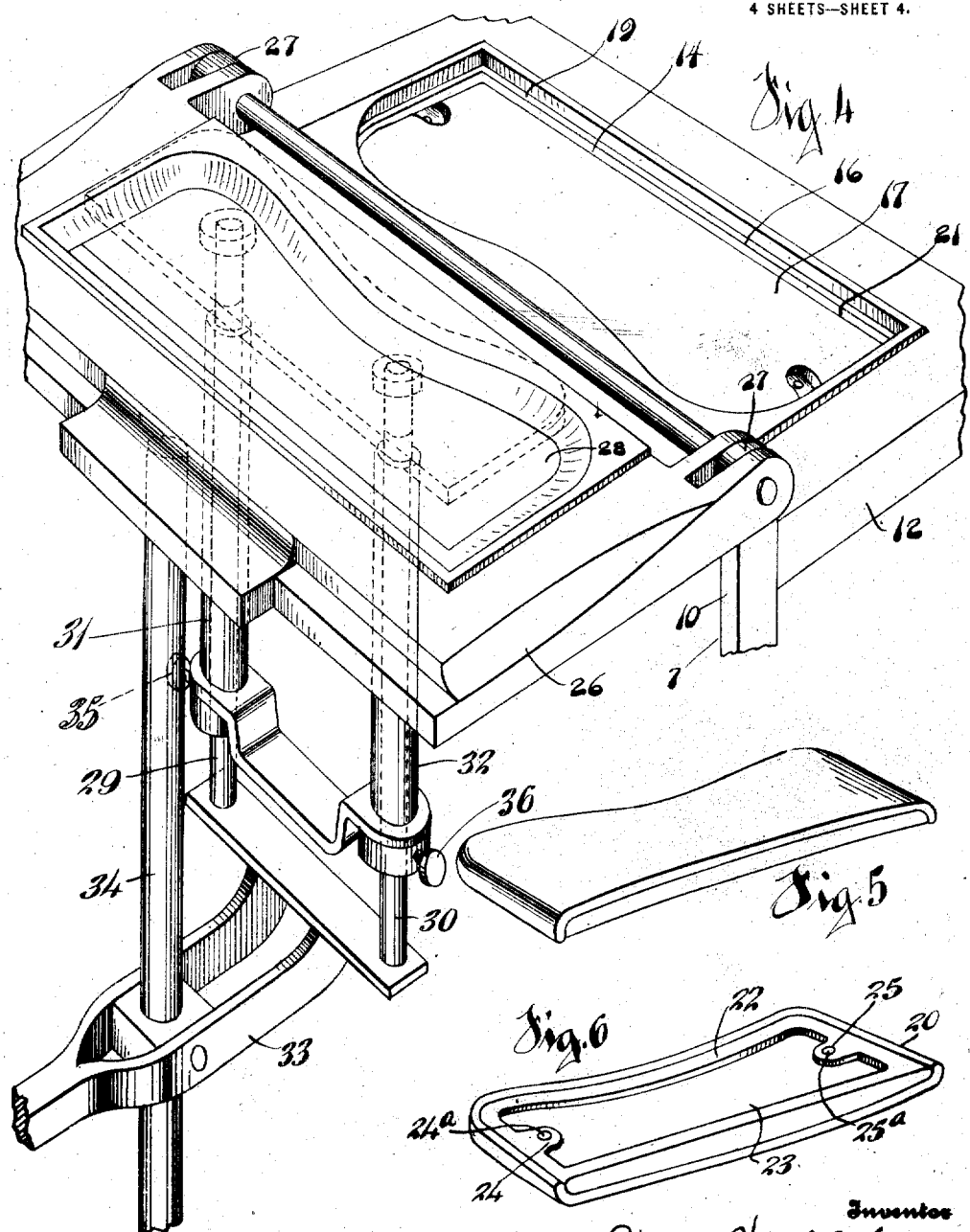

DANIEL W. McNEIL, OF CINCINNATI, OHIO, ASSIGNOR TO THE JOHN DOUGLAS COMPANY, OF CINCINNATI, OHIO, A CORPORATION OF OHIO.

MACHINE FOR MOLDING CERAMICS.

1,253,405.           Specification of Letters Patent.      Patented Jan. 15, 1918.

Application filed March 4, 1914. Serial No. 822,500.

*To all whom it may concern:*

Be it known that I, DANIEL W. MCNEIL, a citizen of the United States of America, and resident of Cincinnati, county of Hamilton, and State of Ohio, have invented certain new and useful Improvements in Machines for Molding Ceramics, of which the following is a specification.

This invention relates to improvements in machines for molding ceramics, and has for an object to produce a machine adapted to mold articles having a flange or rim and in which articles may be molded more quickly and with more uniform consistency than heretofore.

This and other objects are attained in the machine described in the following specification, and illustrated in the accompanying drawings, in which, Figure 1 is a perspective view of the machine embodying my invention. Fig. 2 is a sectional view taken on the line 2—2 of Fig. 1. Fig. 3 is a sectional view taken on the line 3—3 of Fig. 1. Fig. 4 is a fragmental perspective view of the top of my machine, showing the top cover plate thrown back, to show the interior of the mold. Figs. 5 and 6 are perspective top and bottom views, respectively, of an article formed in the machine. Fig. 7 is a fragmental sectional view of a portion of the apparatus illustrated in Fig. 2, but showing the parts occupying different positions relatively to each other.

The machine illustrated as an embodiment of my invention is particularly adapted to be used in forming the covers of flush tanks, and comprises a supporting frame 7, a telescoping mold 8, located at the top of the frame and a hydraulic mold operating mechanism 9, mounted in the frame beneath the mold.

The frame consists of upright support members 10, which are held together at the bottom of base bars 11 and at the top by a mold plate 12, secured at its corners to the members 10.

The mold plate is formed with a depending apron-like portion 13, which, together with the plate, inclose a chamber 14, made in shape to conform to the outer contour of the article to be molded, as for example, the cover shown in Figs. 5 and 6. This chamber is closed at its bottom by a mold plate 15, which consists of a rim 16 having a central movable portion 17. Rim 16 is made to slide snugly within the chamber 14 and is provided with a central opening 18, in which the movable portion 17 may slide, thus forming a mold consisting of a series of telescoping walls. The rim is formed with a groove 19, which is adapted to form the bead 20 of the cover and a flat portion 21, which forms the bearing face 22 of the cover, while the center portion 17 is adapted to form the depression 23 of the cover, with its lugs 24 and 25. This center portion is mounted on resilient members, such as rubber pillars 37, which are supported by a plate 38, secured to the underside of the rim 16. Passing through these pillars are bolts 39, which are secured at their upper ends to the inner portion 17, as shown, and pass freely through openings in the plate 38, with nuts 40 adjustably mounted on the threaded lower ends of the bolts. The bottom mold plate 15 is supported on a block 41, which rests upon the cover 42 of a piston 43 located in a hydraulic cylinder 44, mounted on the base bars 11 of the frame. Block 41 is formed with notches 41ª, 41ᵇ, into which the bolts 39 and adjustable nuts 40 extend. Adjustment of the nuts 40 is accomplished by means of a pin wrench, which is inserted in holes provided in the nuts, and by so adjusting them, the height of the inner portion 17 of the bottom mold plate 15, is adjusted in relation to its surrounding rim 16. The purpose of this adjustment is to regulate the depth of the mold when in its mold-receiving position shown in Fig. 3, in order to enable it to receive the proper amount of material to form the cover. It will be seen that the inner portion 17 is movable with relation to the rim 16, when sufficient force has been brought to bear to compress the rubber pillars 37, to bring the bottom edge of portion 17 into contact with plate 38. In order to form the holes 24ª and 25ª in the lugs 24 and 25 of the cover, as shown in Fig. 6, spring pressed pins 17ª and 17ᵇ are provided. These pins are mounted in holes formed in the center portion 17 of the mold and in the inoperative position thereof, they occupy the positions shown in Fig. 7, in which positions the ends of the pins lie beneath the upper surface of portion 17. When, however, the mold parts have been brought to occupy the positions shown in Fig. 2, the pins are forced upwardly by plate 38, until their ends are forced into the molding material above portion 17, this forming the impressions 24ª and 25ª in the cover.

The top of the mold is formed in the under surface of the cover plate 26, which is hinged to the upper ends 27 of the forward uprights 10 and conforms to the curvature of the top of the tank cover shown in Fig. 5. Part of this top, however, is made in the form of a separate plate and is removable therefrom. The moving of this plate is accomplished by the mechanism shown in Fig. 4, and is for the purpose of facilitating the removal of the molded tank cover from the machine after it has been formed. This mechanism consists of two rods 29 and 30, which are secured to the plate, as shown in Fig. 3, and are moved through inclosing tubes 31 and 32 by means of an operating lever 33, pivotally mounted on a rod 34, extending upwardly from the cover 26. When the lever is operated to move the plate to the position shown in dotted lines in Fig. 4, screws 35 and 36, which are mounted in the ends of tubes 31 and 32, are operated to clamp the rods and plate in the elevated position shown.

The admission of water under pressure to the cylinder 44, through pipe 45, causes piston 43 to rise with mold plate 15 and to compress the molding material located in chamber 14, between the top and bottom mold plates, to form the article to be molded.

In order to prevent the top mold plate from being forced out of position with the body 12 and 13 of the mold, a lock bar 46 is provided, which is pivotally mounted at points 47 on the base of the frame and is formed with a projection or lug 48, adapted to move into clamping and locking engagement with the top surface of the plate 26, as shown in Fig. 3, its frictional engagement therewith being sufficient to maintain it in this position. In its normal or released position, it rests against a rod 49, extending between rearwardly projecting members 50 of the frame.

In operation;

Let it be assumed that the cover 26 is occupying the position shown in Fig. 4, while the movable rim 16 and center portion 17 of the bottom mold plate is occupying the positions shown in Fig. 3. The mold is now entirely filled with potters' dust containing a certain amount of water.

Plate 28 is now locked in the position shown in full lines, Fig. 4, by means of the screws 35 and 36, and the cover 26 is turned over to rest upon the top of the mold. Lock bar 46 is then swung into place, so that its locking lug 48 engages the top of the plate 26, as shown in Fig. 3.

Water is admitted to the pipe 45 and cylinder 44 and is pumped to a high pressure. In bringing the pressure from zero to this high pressure, the piston 43 is caused to rise, carrying block 41 and bottom mold plate 16 and 17 with it. As this plate moves upwardly, the loose material in the mold is gradually compressed until it reaches a compactness which is sufficiently great to overcome the resiliency of the rubber pillars 37. At this point, the upward movement of the center portion 17 of the bottom mold plate is arrested, and the rim 16 continues its upward movement. As the rim moves up, plate 38 contacts the bottom of the center portion 17 and both the rim and center portion are forced upwardly to the position shown in Fig. 2.

Before plate 38 contacts center portion 17 however, to force it to rise, pins 17ª and 17ᵇ are forced into the molding material, as shown in Fig. 2, thereby forming the holes 24ª and 25ª in the cover.

The air contained in the loosely packed material contained in the mold previous to compression, is caused to escape through the air passages 51, formed around the loosely fitting plate 28, as the molding material is gradually compressed.

The molding operation having now been completed, the water in pipe 45 and cylinder 44 is released. The piston moves to its normal position, and the movable bottom members of the mold are permitted to move to the positions shown in Fig. 3. The molded cover will remain in position against the cover plate of the mold, however, because of the suction or friction created by the cover occupying the concave space of the cover plate 26, and also because the lower or bottom mold plate is removed in sections instead of the entire plate being removed at one time. When the bottom of the mold moves away from the molded cover, the rim 16 first moves downwardly, together with the pins 17ª and 17ᵇ, thus causing the suction created between the molded cover and the bottom mold plate to be broken. The center portion 17 is held against the molded cover by the compressed rubber pillars 37, when rim 16 is moving downwardly, in order to prevent breakage of the freshly molded cover and to prevent it from being withdrawn from the top cover plate 26.

After rim 16 and its mounting plate 38 have moved downwardly sufficiently far to permit the nuts 40 to contact the under face of plate 38, the center portion 17 will be withdrawn from the molded cover and will move with its connected parts to the position shown in Fig. 3.

Lock bar 46 is now thrown back so that it rests against cross bar 49. Cover plate 26 is lifted and moved to a position at the front of the machine, as shown in Fig. 4.

The molded cover, because of the suction or friction existing between it and the cover plate, has now been brought to an accessible position outside of the mold and is removed by releasing the screws 35 and 36 and then carefully operating lever 33 to lift the center plate 28 of cover plate 26, so that the molded cover will not be broken in lifting it from curved molding surface of plate 26. Having been lifted on plate 28, to the position indicated by dotted lines, Fig. 4, it may be easily removed and placed in the drying room, ready for glazing and baking.

Having thus described my invention, what I claim is:

1. In a mold for compressing an article having a flange, the combination of a wall adapted to contact with one side of the article, a wall opposite said wall and consisting of a central portion and a portion surrounding and separated from said central portion, a plate adjacent to and adapted to contact with said surrounding portion, elastic members between said central portion and said plate, and means for reciprocating the plate, said walls having a space between them for the reception of material to be compressed.

2. In a mold for compressing an article having a flange, the combination of a wall adapted to contact with one side of the article, a wall opposite said wall and consisting of a central portion and a portion surrounding and separated from said central portion, a plate adjacent to and adapted to contact with said surrounding portion, elastic members between said central portion and said plate, means for reciprocating the plate, pins mounted upon said plate, projecting to a point below the inner wall of the central portion and adapted to project beyond said inner wall, when the plate has reached the inner limit of its travel.

3. In a mold for forming an article having a central portion surrounded by a flange, the combination of a chamber-inclosing body portion, a top mounted upon the body portion, and a bottom reciprocally mounted in the body portion, such bottom consisting of a rim to contact with the flange, a central portion adjustably and removably mounted in the rim, adapted to have restricted movement relatively to the rim and to contact with the central portion of the article, means for imparting simultaneous movement to the rim and the central portion until the latter exerts a predetermined pressure upon the central portion of the article, and means for continuing the movement of the rim until it exerts a similar pressure upon the flange of the article.

In testimony whereof, I have hereunto subscribed my name this 2nd day of March, 1914.

DANIEL W. McNEIL.

Witnesses:
W. THORNTON BOGERT,
B. R. KROPF.